United States Patent
Gewirtz et al.

(10) Patent No.: US 9,027,441 B2
(45) Date of Patent: May 12, 2015

(54) SPHERICAL GEAR

(75) Inventors: Jamie Gewirtz, Glenside, PA (US); Jason R. Halpern, Collingswood, NJ (US)

(73) Assignee: Tangent Robotics LLC, Philadelphia, PA (US)

( * ) Notice: Subject to any disclaimer, the term of this patent is extended or adjusted under 35 U.S.C. 154(b) by 741 days.

(21) Appl. No.: 13/142,109

(22) PCT Filed: Jun. 7, 2010

(86) PCT No.: PCT/US2010/037634
§ 371 (c)(1),
(2), (4) Date: Jun. 24, 2011

(87) PCT Pub. No.: WO2010/144367
PCT Pub. Date: Dec. 16, 2010

(65) Prior Publication Data
US 2012/0067166 A1    Mar. 22, 2012

Related U.S. Application Data

(60) Provisional application No. 61/185,054, filed on Jun. 8, 2009.

(51) Int. Cl.
*F16H 37/06* (2006.01)
*F16H 1/24* (2006.01)
*B25J 9/10* (2006.01)
*F16H 1/00* (2006.01)

(52) U.S. Cl.
CPC . *F16H 1/24* (2013.01); *B25J 9/102* (2013.01); *F16H 1/006* (2013.01); *F16H 37/065* (2013.01); *Y10S 901/18* (2013.01)

(58) Field of Classification Search
USPC ..... 74/665 C, 665 G, 665 GC, 434, 437, 417, 74/423, 457 B; 901/18
See application file for complete search history.

(56) References Cited

U.S. PATENT DOCUMENTS 2,609,703 A * 9/1952 Hesch, Sr. ............. 74/424.5
3,267,755 A * 8/1966 Isely ..................... 476/11
3,333,479 A * 8/1967 Shields ................. 476/51

(Continued)

FOREIGN PATENT DOCUMENTS

BE    885 424 A1    1/1981
DE    26 50 204 A1  5/1978

(Continued)

OTHER PUBLICATIONS

Liu Hu Ran, "A New Kind of Spherical Gear and its Application in a Robot's Wrist Joint" Journal of Robotics and Computer-Integrated Manufacturing, Aug. 2009, vol. 25, Issue 4-5, Pergamon Press, Tarrytown NY.

(Continued)

*Primary Examiner* — William Kelleher
*Assistant Examiner* — Zakaria Elahmadi
(74) *Attorney, Agent, or Firm* — Duane Morris LLP

(57) ABSTRACT

A gear includes a body defining a portion of a sphere and including at least one curved surface. A plurality of teeth extend from the at least one curved surface. The plurality of teeth are arranged in rows and columns that define a plurality of longitudinal and latitudinal arcuate channels along the curved surface.

15 Claims, 10 Drawing Sheets

(56) References Cited

U.S. PATENT DOCUMENTS

| | | | |
|---|---|---|---|
| 3,803,904 A * | 4/1974 | Diem et al. | 73/640 |
| 3,835,464 A * | 9/1974 | Rider | 345/164 |
| 4,174,914 A * | 11/1979 | Ainoura | 407/26 |
| 4,538,476 A * | 9/1985 | Luque | 74/471 XY |
| 4,607,538 A * | 8/1986 | Geisthoff | 74/417 |
| 4,635,501 A * | 1/1987 | Mizuno et al. | 74/433.5 |
| 4,805,477 A | 2/1989 | Akeel | |
| 5,129,275 A * | 7/1992 | Park | 74/417 |
| 5,419,008 A * | 5/1995 | West | 16/25 |
| 5,497,671 A * | 3/1996 | Rourke | 74/416 |
| 5,533,418 A * | 7/1996 | Wu et al. | 74/490.06 |
| 5,645,507 A * | 7/1997 | Hathaway | 476/47 |
| 6,467,374 B1 * | 10/2002 | Kaplun | 74/640 |
| 6,494,635 B1 * | 12/2002 | Merlo | 403/90 |
| 7,036,392 B2 * | 5/2006 | Eldally | 74/437 |
| 7,147,587 B2 * | 12/2006 | Kaplun | 476/55 |
| 7,779,728 B2 | 8/2010 | Hetrick | |
| 7,857,727 B2 * | 12/2010 | Rung | 476/72 |
| 8,251,863 B2 * | 8/2012 | Faulring et al. | 476/38 |
| 2002/0040613 A1 * | 4/2002 | Brooks | 74/423 |
| 2004/0159172 A1 * | 8/2004 | Barkdoll | 74/423 |
| 2007/0290117 A1 | 12/2007 | Hetrick et al. | |

FOREIGN PATENT DOCUMENTS

| | | |
|---|---|---|
| DE | 199 12 761 A1 | 9/1999 |
| FR | 1 564 116 A | 4/1969 |
| JP | 57 094132 A | 6/1982 |
| SU | 1 388 622 A1 | 4/1988 |
| TW | 273 008 B | 2/2007 |
| WO | 2006/018665 A1 | 2/2006 |

OTHER PUBLICATIONS

International Search Report/Written Opinion issued Sep. 23, 2011 in counterpart PCT Application No. PCT/US2010/037634.

* cited by examiner

SPHERICAL GEAR

CROSS-REFERENCE TO RELATED APPLICATIONS

This application is a national stage entry under 35 U.S.C. §371 of PCT/US2010/037634, filed on Jun. 7, 2010, which claims priority to U.S. Provisional Patent Application No. 61/185,054 filed on Jun. 8, 2009, the entireties of which are herein incorporated by reference.

FIELD OF DISCLOSURE

The disclosed system and methods relate to gears. More specifically, the disclosed system and methods relate to a partial spherical gear enabling the generation of complex motion.

BACKGROUND

In the growing field of robotics and clean electricity generation, new methods of mechanical actuation will be valuable in developing different types of robotic and power generating systems. Before the advent of optical mice, a traditional mouse generated directional signals for the cursor on the screen via a rubber ball which was in contact with two roll pins mounted perpendicular to one another in the XY plane. This allowed the cursor on the computer screen to move in any direction with respect to the XY plane of the screen. When moving the mouse forward or backwards with respect to the user, only the y-roller pin would be actuated and the mouse on the screen would move up and down. When the mouse was moved from side to side, only the x-roller pin would move and the cursor would move side to side on the screen.

However when the mouse was moved at a diagonal with respect to the user, a combination output of the roller pins would allow the cursor to move at various vectors with respect to the XY plane of the computer screen. In this sense, the roller pins of the mouse were passive devices that took "input" from the trackball and then displayed that motion as movement of the cursor on the screen. Furthermore, if these pins were actuated via a motor and "outputted" motion to the trackball, a force feedback mouse could in theory be created. This is an excellent way to create motion in a robot, or in theory to even generate electricity, but is limited by the fact that the rubber on plastic interaction between the track ball, and the rolling pins is unable to generate large amounts of torque.

Furthermore, when the x-pin for example is actuated by the track ball, the rubber ball will actually "drag" along the y-roller pin and will generate friction. This is true in the opposite situation as well. When both pins are being actuated (when the mouse is moving for example at a 45 degree angle) there is drag occurring on both pins. Thus, in addition to the inability to create large amounts of torque this device also creates friction between the trackball and the roller pins. This is acceptable in some robotic systems such as those seen in U.S. Pat. No. 5,952,796 entitled "Cobots", as well as in U.S. Pat. No. 5,923,139 entitled "Passive robotic constraint devices using non-holonomic transmission elements", the entireties of which are herein incorporated by reference. However in systems that require larger amounts of torque with lower friction, the surface-to-surface trackball system cannot work in its purest form.

Accordingly, an improved system and method for generating high-torque and low-friction for two-degree of freedom mechanical applications is desirable.

SUMMARY

A gear is disclosed that includes a body defining a portion of a sphere and including at least one curved surface. A plurality of teeth extend from the at least one curved surface. The plurality of teeth are arranged in rows and columns that define a plurality of longitudinal and latitudinal arcuate channels along the curved surface.

Also disclosed is a gear system that includes a gimbal and first, second, and third gears. The first gear has a body that defines a portion of a sphere and includes a curved surface. The first gear is coupled to the gimbal and includes a plurality of teeth extending from the curved surface. The second gear includes a plurality of teeth and is disposed adjacent to the first gear such that the plurality of teeth of the second gear engage the plurality of teeth of the first gear. The third gear includes a plurality of teeth and is disposed adjacent to the first gear such that the plurality of teeth of the third gear engage the plurality of teeth of the first gear. The second gear rotates about a first axis when the first gear moves in a first direction, and the third gear rotates about a second axis when the first gear moves in a second direction that is substantially perpendicular to the first direction.

A gear system is also disclosed that includes a first support structure, a first gear including a body defining a portion of a sphere and including a first curved surface, and first and second spur gears. The first gear is coupled to the first support structure by a first gimbal. A plurality of teeth extend from the first curved surface in a plurality of rows and columns that define a plurality of channels. The first and second spur gears are supported by the first support structure in an approximately orthogonal relationship to one another. The first spur gear includes a plurality of teeth that engage the plurality of teeth of the first gear such that the first spur gear rotates about a first axis when the first gear moves in a first direction. The second spur gear includes a plurality of teeth that engage the plurality of teeth of the first gear such that the second spur gear rotates about a second axis when the first gear moves in a second direction that is approximately orthogonal to the first direction.

BRIEF DESCRIPTION OF THE DRAWINGS

These and other features and advantages of the present invention will be more fully disclosed in, or rendered obvious by the following detailed description of the preferred embodiments of the invention, which are to be considered together with the accompanying drawings wherein like numbers refer to like parts and further wherein.

DETAILED DESCRIPTION

Figure 1:
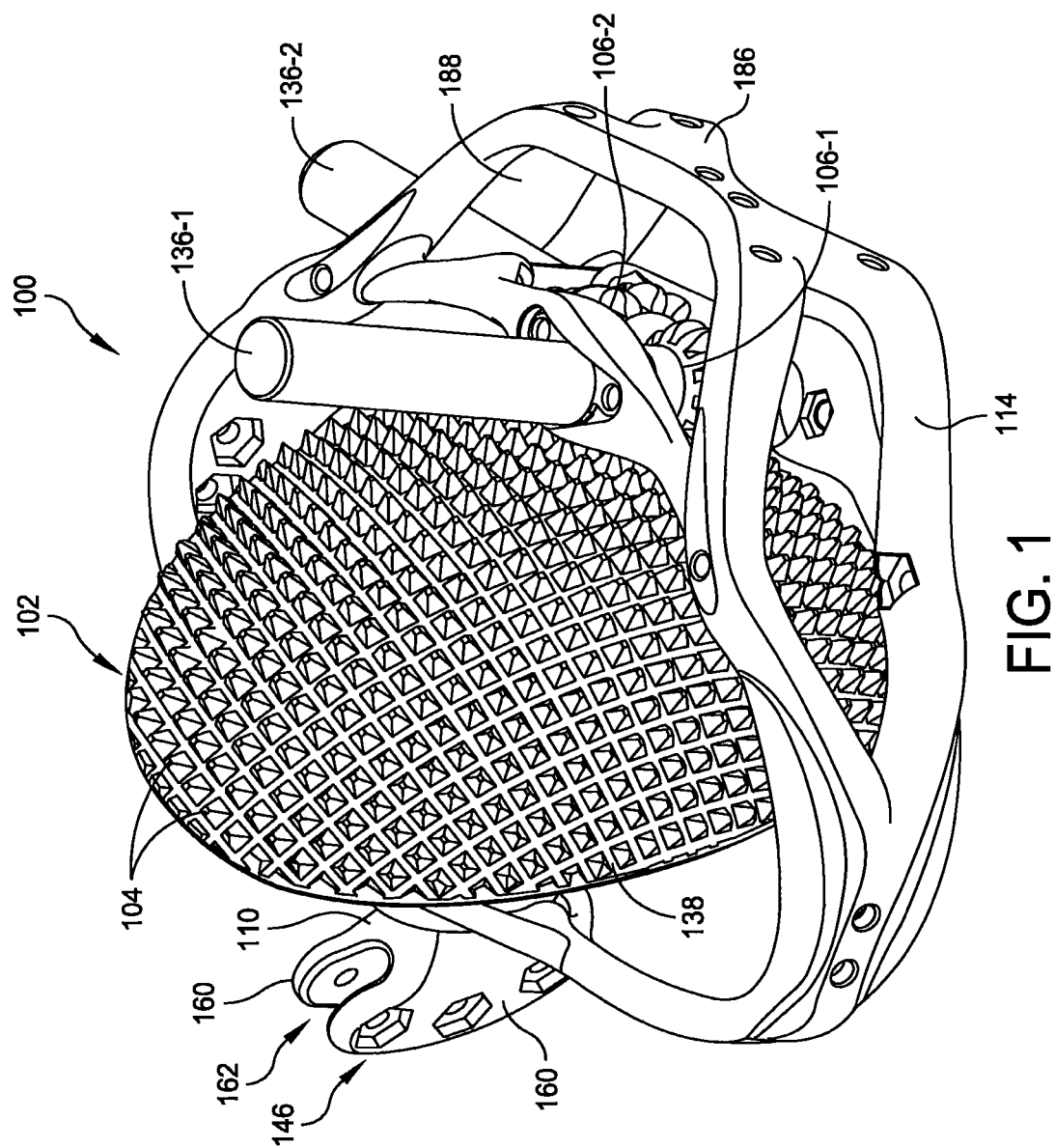
FIG. 1 is an isometric view of one example of an improved gear assembly.

This description of preferred embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral," and the like are to be interpreted relative to one another or relative to an axis of elongation, or an axis or center of rotation, as appropriate. Terms concerning attachments, coupling, and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

A gear system that can be used to create mechanical motion as an output device or to create electricity when used as an input device is now described. A partial spherical gear is coupled to a two-axis pivot or gimbal that provides for motion in a plurality of directions. The pivot creates a "focal point" at the center and the arrangement allows for full rotation of the partial sphere about the focal point. The angles of the teeth of the partial spherical gears, the arc, and radius of the partial sphere correspond to the focal point of the pivot.

The improved gear assembly may be used to generate rotational motion in a plurality of directions by actuating the spherical gear or one of the at least two spur gears that interface with the spherical gear. The spur gears can be mounted to a motor or other device in order to generate electricity. Additionally or alternatively, the gear assembly may be implemented to output motion through the partial spherical gear if the individual spur gears are actuated. Each of the components of the gear assembly may be fabricated from any material such as, for example, metals, ceramics, polymers, or the like. The components may be fabricated by casting, machining, molding, additive manufacturing such as, for example, three-dimensional printing, or other suitable manufacturing techniques as will be understood by one skilled in the art.

FIGS. 1-7 illustrate one example of a gear assembly 100. As shown in FIGS. 1-7, gear assembly 100 includes a partial spherical gear 102 having a plurality of teeth 104, two spur gears 106-1 and 106-2 (collectively referred to herein as "spur gears 106") each having a plurality of teeth 108, and a mounting rod 110 coupling spherical gear 102 to a pivot 112, which is supported by a support structure 114. Support structure 114 may also be coupled to spur gears 106.

Figure 2:
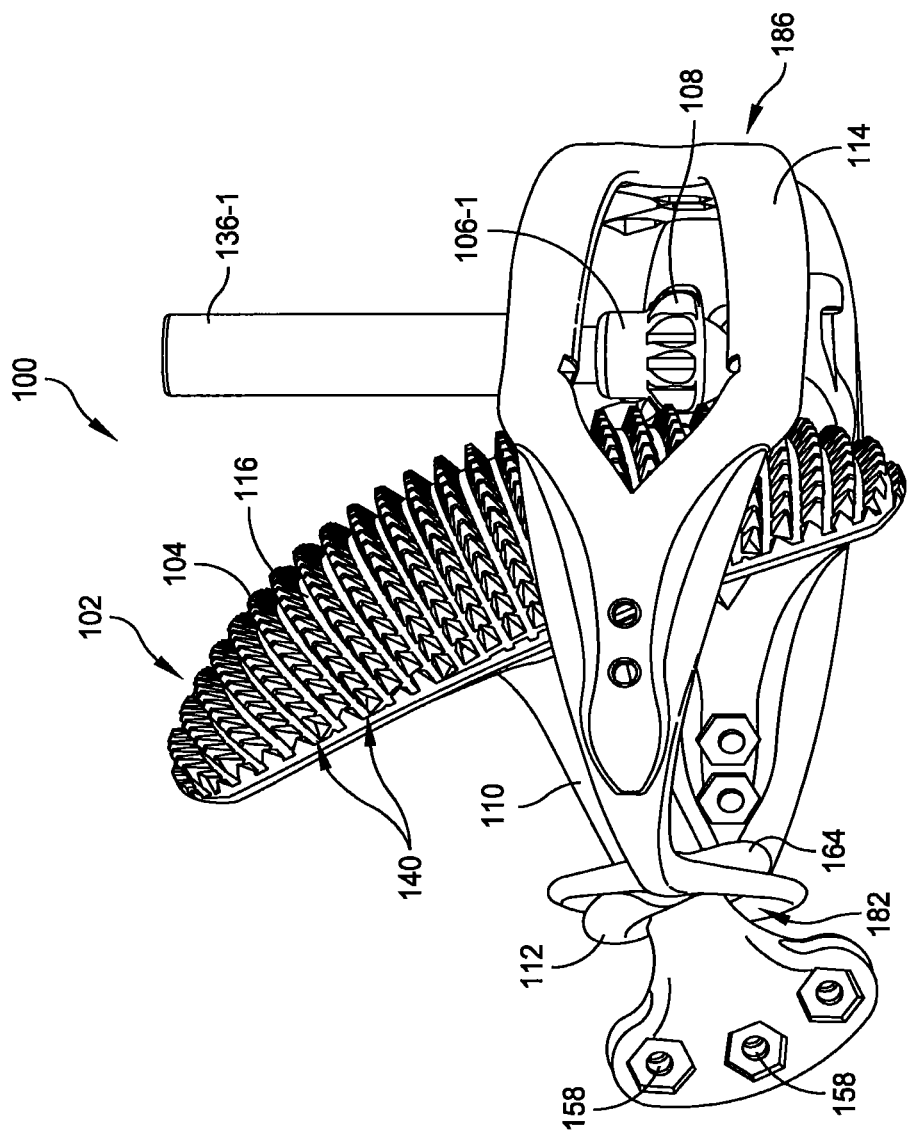
FIG. 2 is a side view of the improved gear assembly illustrated in FIG. 1.

As best seen in FIGS. 1 and 2, teeth 104 of partial spherical gear 102 are disposed on a curved surface 116 of the spherical gear 102. Although the teeth 104 are illustrated in the figures as being disposed on a convex surface, one skilled in the art will understand that teeth 104 may be disposed on a concave surface of spherical gear 102. Teeth 104 are arranged on curved surface 116 of partial spherical gear 102 such that they correspond to an arc defined by curved surface 116 with respect to the central point 118 of pivot 112. Teeth 104 may have any variety of cross-sectional shapes including, but not limited to, square, triangular, rectangular, polygonal, or the like. Teeth 104 are quadrilateral pyramids extending from curved surface 116 such that teeth 104 have a greater cross-sectional area at the base 120 and a smaller cross-sectional area at the tip 122 as best seen in FIGS. 1-3A.

The curvature of curved surface 116, including tips 122 of teeth 104, corresponds to the distance from the center 118 of pivot 112 to tips 122. For example, partial spherical gear 102 has a radius of curvature that corresponds to the distance from the center of pivot 112 to the tips 122 such that teeth 104 that mesh with teeth 108 of spur gears 106 remain tangent to the spur gears 106 when the partial spherical gear 102 rotates about the pivot 112.

Figure 5:
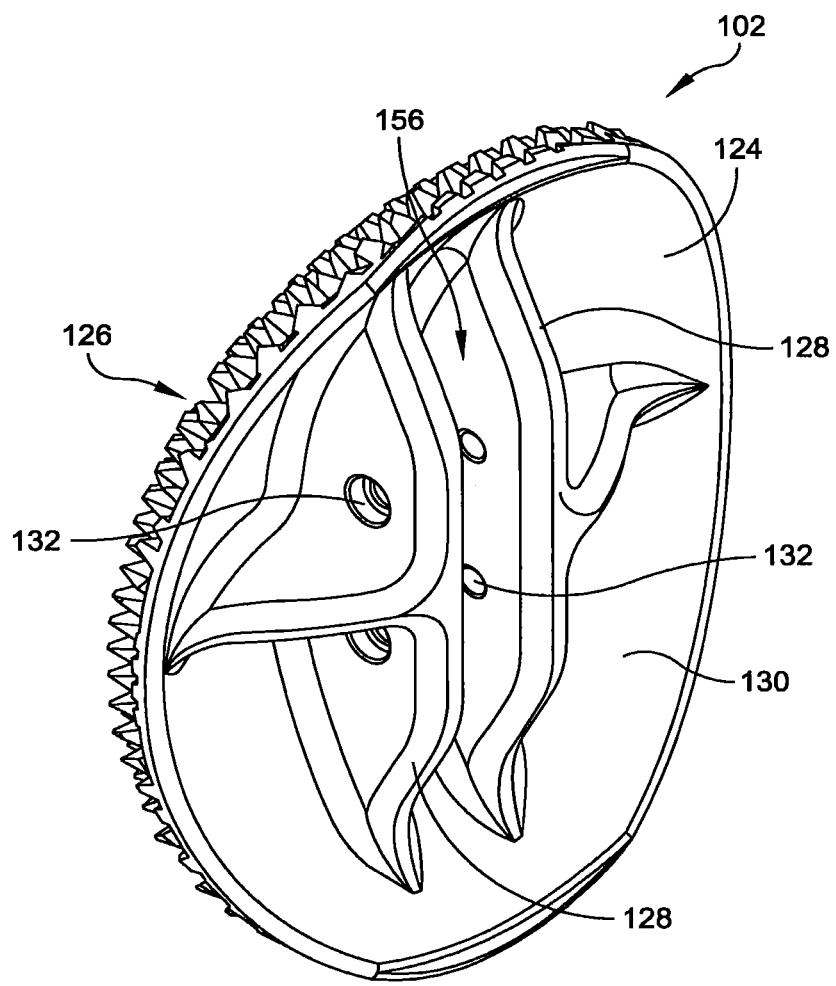
FIG. 5 is an isometric view of the mounting side of a spherical gear in accordance with the gear assembly illustrated in FIG. 1.

As best seen in FIG. 5, the mounting side 124 of spherical gear may have a concave shape that is complementary to the convex shape of the interface side 126 that includes teeth 104. In some embodiments, mounting side 124 may be planar or have another geometry as will be understood by one skilled in the art. One or more mounting structures 128 extend from the surface 130 of mounting side 124. As shown in FIG. 5, mounting structures 128 may be fins that extend from the surface 130 of mounting side 124 and each define one or more holes 132 for use in coupling spherical gear 102 to mounting rod 110 as described below.

Figure 3A:
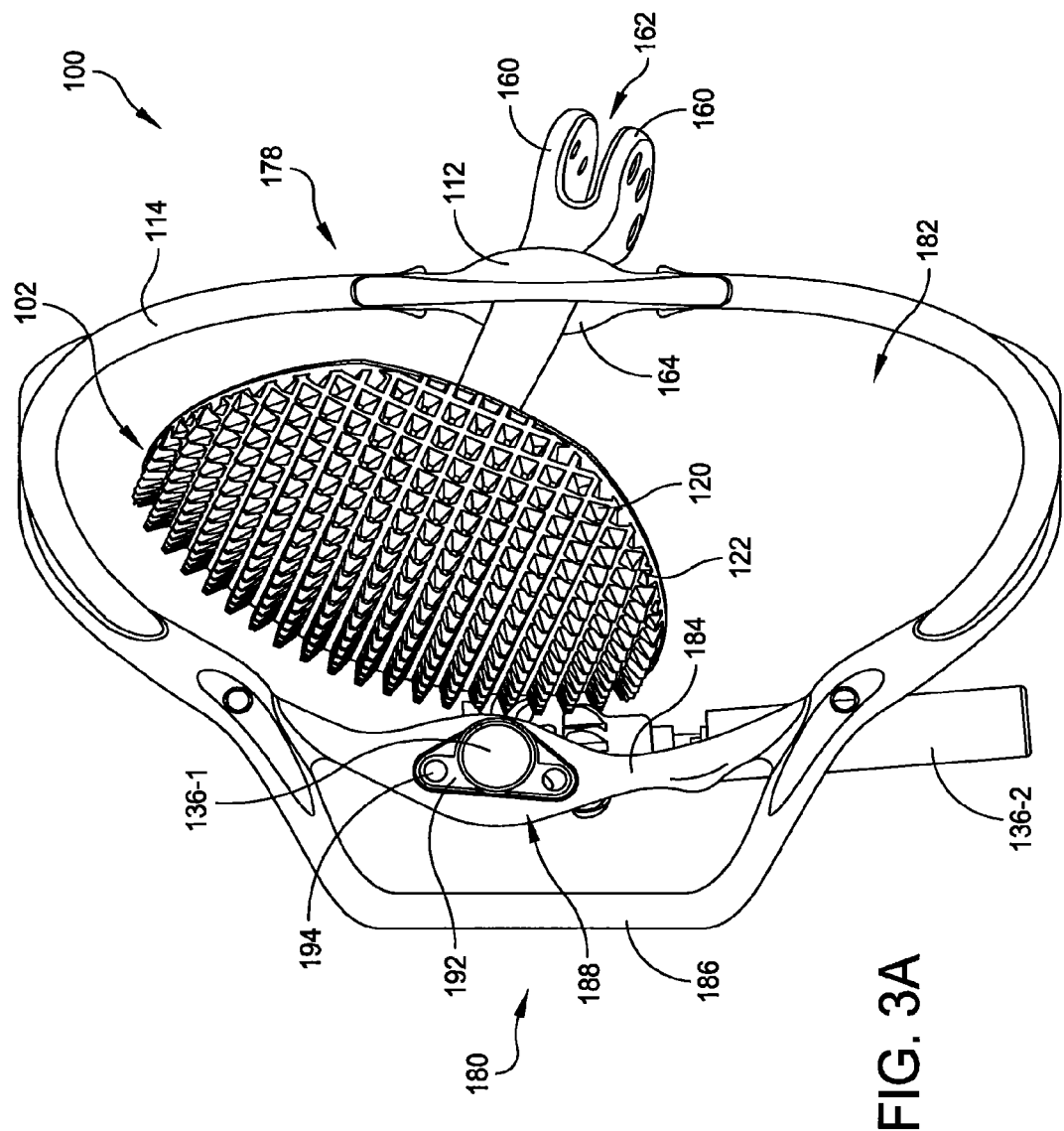
FIG. 3A is a top side view of the gear assembly illustrated in FIG. 1.
Figure 3B:
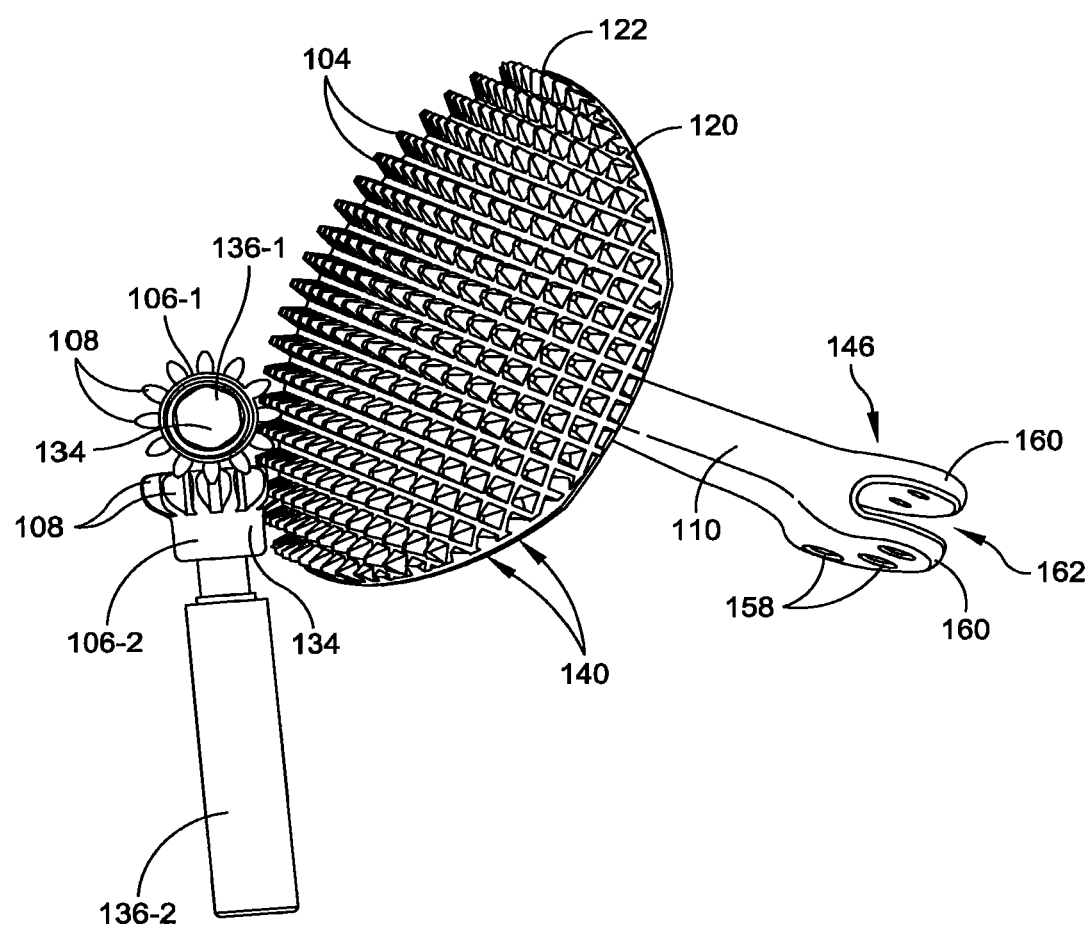
FIG. 3B is a top side view of the spur gears and spherical gears illustrated in FIG. 3A.

Spur gears 106 each include a plurality of teeth 108 that extend from a central cylindrical body 134 and are configured to be disposed in tangential relationship to the curved surface 116 of spherical gear 102 as best seen in FIG. 3A. Spur gears 106 are disposed 90 degrees from one another and may each be coupled to a respective motor 136-1 and 16-2 (collectively referred to herein as "motors 126") as best seen in FIG. 3B. The teeth 108 of spur gears 106 have a shape configured to be disposed between and engage adjacent teeth 104 of spherical gear 102. For example, teeth 108 may have a rectangular cross-sectional geometry in a first direction and a triangular or tapered rectangular cross-sectional geometry and in a second direction that is orthogonal to the first direction such that the teeth 108 are tapered and may be received within a gap 138 defined by adjacent teeth 104 of sphere gear 102.

In one embodiment, teeth 108 have a length that is sufficient to engage an adjacent pair of teeth 104 while extending across a gap 188 between the adjacent teeth 104 such that as the spherical gear 102 moves relative to gears 106, teeth 108 remain disposed within a channel 140 defined by a plurality of teeth 104 extending in the same direction as best seen in FIG. 3B. Teeth 108 have widths that are less than the distance between adjacent teeth 104 disposed on spherical gear 102. The height of teeth 108 that radially extend from cylindrical body 134 may vary depending on the position of gears 106 with respect to spherical gear 102. One skilled in the art will understand that teeth 108 may have other geometries, lengths, widths, and heights.

Figure 6:
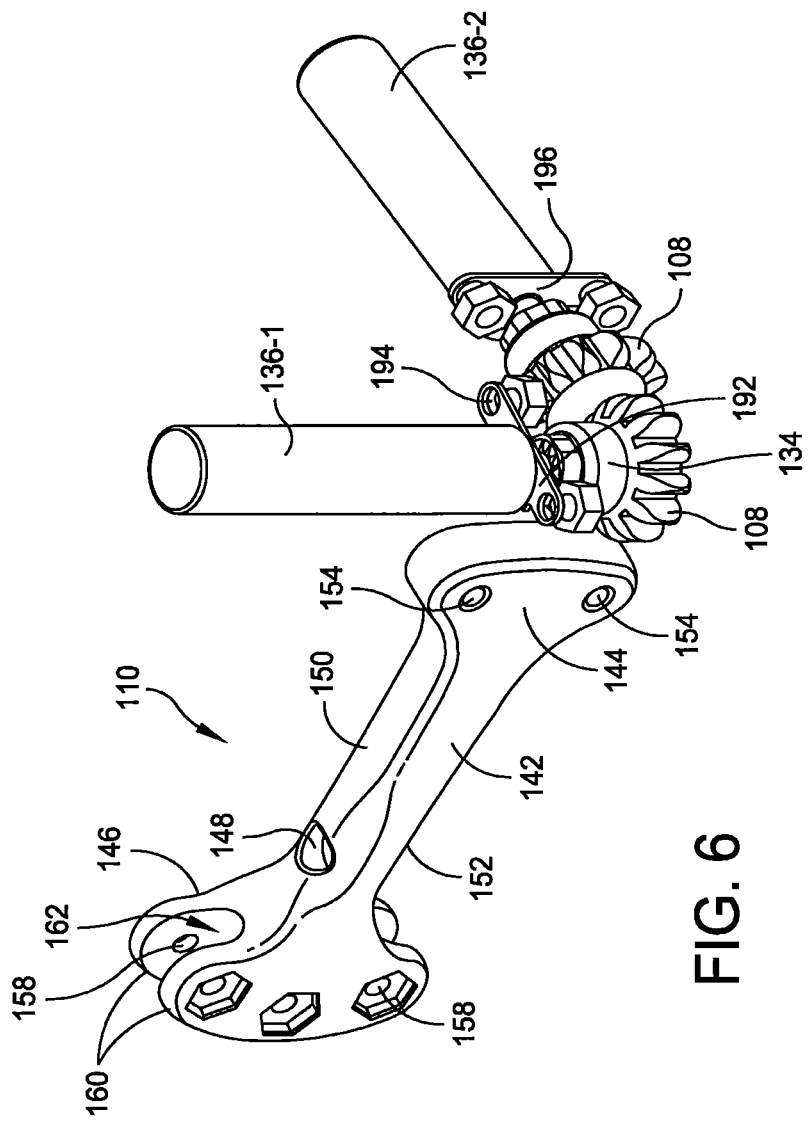
FIG. 6 is an isometric view of the spur gears and mounting rod in accordance with the gear assembly illustrated in FIG. 1.

As best seen in FIG. 6, mounting rod 110 has an elongate body 142 having a gear mounting end 144 and a second mounting end 146 that each flare out from elongate body 142.

Elongate body defines a through hole 148 adjacent to second mounting end 146 that extends from a top surface 150 to a bottom surface 152.

Gear mounting end 144 may include one or more holes 154 that are sized and arranged to align with holes 132 defined by mounting structures 128. In some embodiments, holes 154 may be replaced by one or more detents configured to engage holes 132 defined by mounting structures 128 as will be understood by one skilled in the art. In embodiments where spherical gear 102 and mounting rod 110 are monolithic, mounting end 144 may not include holes 154 or detents as will be understood by one skilled in the art. Gear mounting end 144 is dimensioned to be within the space 156 defined by mounting structures 128 of spherical gear 102. However, one skilled in the art will understand that gear mounting end 144 may be forked such that a single mounting structure 128 may be received therein.

Second mounting end 146 may also defined a plurality of holes 158 for coupling to another device or structure. As best seen in FIG. 6, second mounting end 146 may include a pair of projections 160 that together define a slot 162 for receiving another device or structure as described below. Each of the projections 160 may include holes 158 that align or correspond to holes disposed on the other projection 160.

Figure 7:
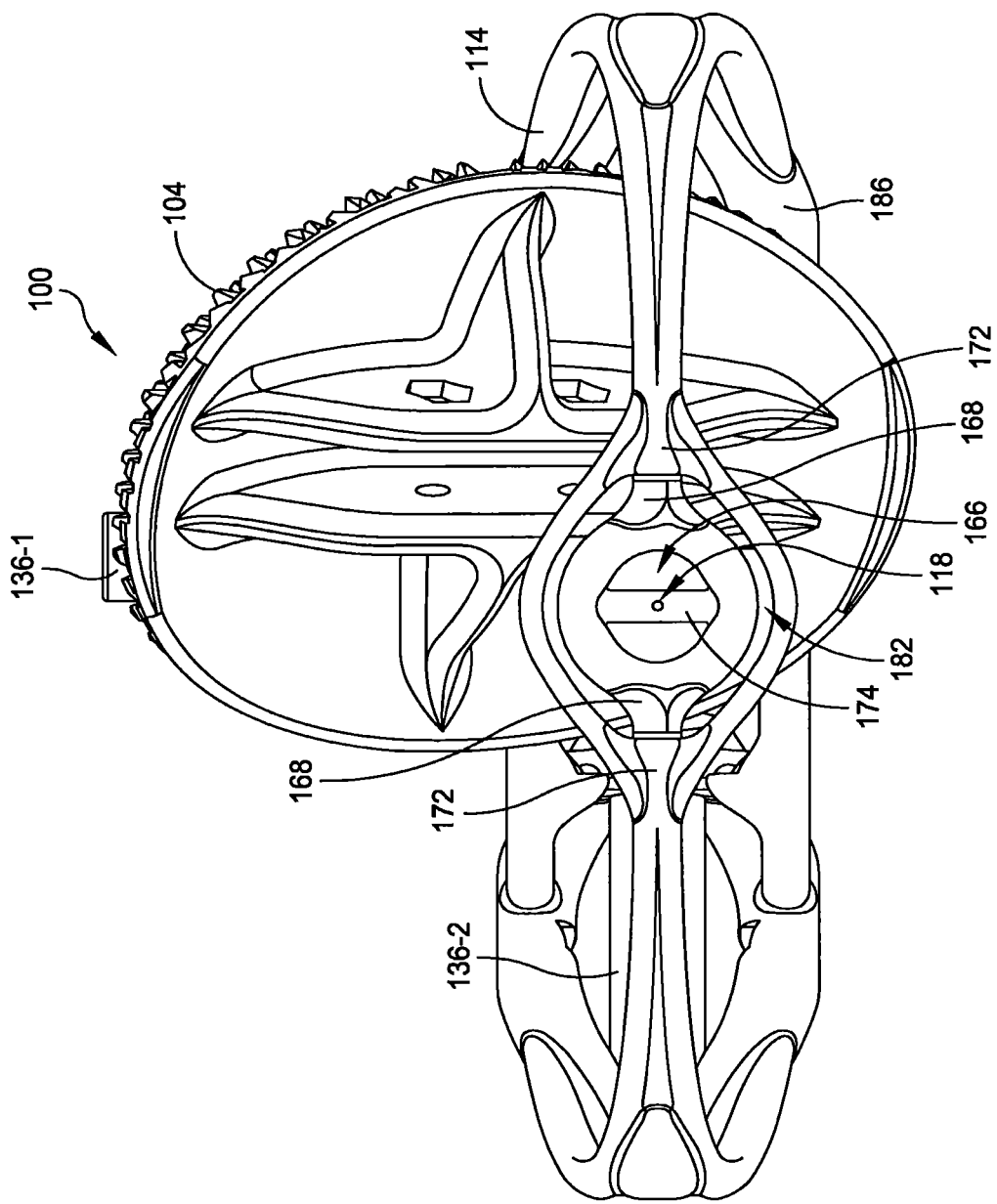
FIG. 7 is a rear end view of the gear assembly illustrated in FIG. 1 with the mounting rod having been removed.

Turning now to FIG. 7, pivot 112, which may be a two-axis gimbal, includes a body 164 defining an opening 166 sized and configured to receive elongate body 142 of mounting rod 110 therein. Body 164 may have a rectangular, circular, elliptical, or other shape that defines opening 166. A pair of extensions 168 the extend from an outer surface 170 of pivot body 164 that are sized and configured to be received in a bearing 172 of support structure 114 as described below. A shaft 174 extends across opening 166 and is sized and configured to be received within hole 148 defined by elongate body 142 of mounting rod 110.

Support structure 114 may include one or more components configured to support spur gears 106, pivot 112, and mounting rod 110 such that an engagement is maintained between teeth 104 of spherical gear 102 and teeth 108 of spur gears 106. In one embodiment, support structure 114 has a substantially ovoid body 176 including a pivot support side 178 disposed opposite a mounting side 180 as best seen in FIG. 3A. Pivot supporting side 178 may define an aperture 182 for receiving pivot 112 therein. Bearings 172 (FIG. 7) may be disposed on opposite sides of aperture 182 and sized and configured to receive extensions 168 of pivot body 164.

Figure 4:
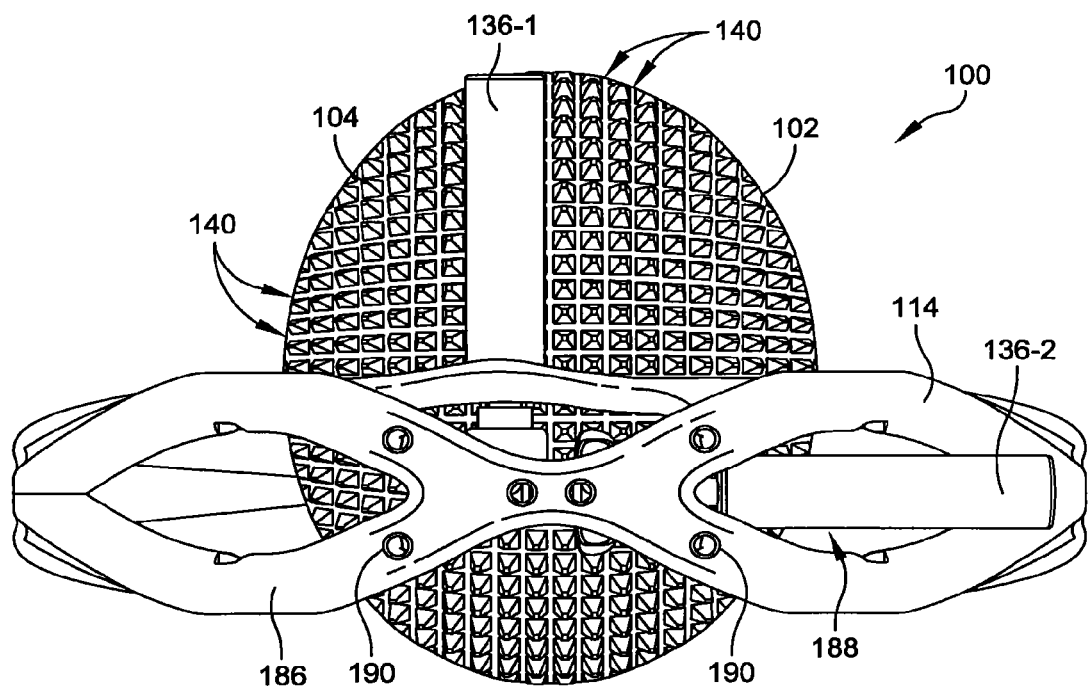
FIG. 4 is a front end view of the gear assembly illustrated in FIG. 1.

Mounting side 180 includes gear mounting section 184 disposed adjacent to an assembly mounting section 186. As best seen in FIGS. 1 and 4, gear mounting section 184 that defines a pair of openings 188 that are orthogonal to one another and are sized and configured to receive motors 136 coupled to spur gears 106 therethrough. Gear mounting section 184 is spaced apart from pivot support side 178 such that spherical gear 102 may be received in aperture 182. Assembly mounting section 186 defines a plurality of mounting holes 190 for coupling gear assembly 100 to another gear assembly or to another device in a larger system as described below.

Gear assembly 100 is assembled by inserting extensions 168 of pivot body 164 into bearings 172 of support structure 114. Mounting rod 110 is inserted into opening 166 of pivot body 164 until hole 148 that extends through elongate body 142 of mounting rod 110 aligns with holes (not shown) for receiving shaft 174. Shaft 174 is received within hole 148 of elongate body 142 to effectively cross-pin mounting rod 110 to pivot 110. Hole 148 receives shaft 174 with a slip fit such that mounting rod 110 may pivot about shaft 174 as will be understood by one skilled in the art.

Spur gears 106 may be coupled to motors 136 by mounting each of the gears 106-1, 106-2 on a shaft (not shown) of a respective motor 136-1, 136-2 or by a transmission (not shown) as will be understood by one skilled in the art. An adapter plate 196 may be used to mount the gears 106 and motors 136 to support structure 114. Adapter plate 196 may include a pair of holes 198 for receiving screws or bolts (not shown) for securing adapter plate 196, spur gears 106, and motors 136 to support structure 114. Spherical gear 102 is coupled to gear mounting end 144 of mounting rod 110 by aligning holes 132 on mounting side 124 with holes 154 of gear mounting end 144. Screws and/or bolts (not shown) may be used in connection with nuts (not shown) to secure spherical gear 102 to gear mounting end 144 of mounting rod 110. In some embodiments, holes 132 may be threaded such that the threads of the screws engage the threads of holes 132 for securing spherical gear 102 to mounting rod 110. In still other embodiments, gear mounting end 144 may include detents for engaging holes 132 of spherical gear 102, or spherical gear 102 and mounting rod 110 may be monolithic. One skilled in the art will understand that spherical gear 102 may be coupled to mounting rod 110 using other coupling methods including, but not limited to, using adhesives, cross-pinning soldering, and combinations thereof.

In operation, teeth 104 of spherical gear 102 mesh with teeth 108 of the two tangent spur gears 106 each of which is mounted in the XY plane orthogonal to one another in order to create a two-degree of freedom joint for the purpose of power transmission. Spur gears 106 are positioned such that when only spur gear 106-1 is actuated, for example, teeth 108 of spur gear 106-2 are disposed within channels 140 of spherical gear 102 and do not turn. Conversely, when only spur gear 106-2 is actuated, teeth 108 of spur gear 106-1 are disposed within channels 140 of spherical gear 102 such that teeth 104 of spherical gear 102 do not engage teeth 108 of spur gear 106-1 and spur gear 106-1 does not turn. When both spur gears 106 are actuated, teeth 104 of spherical gear 102 engages teeth 108 of both spur gears 106. Different combinations of outputs from each spur gear 106-1, 106-2 provides different angles of output resulting in an output vector that is a product of the motion of each spur gear 106-1, 106-2. A specific vector may be created in a plane that is parallel to the central position of spherical gear 106 depending on the rotational speed of each spur gear 106-1, 106-2 with respect to time when outputting to spherical gear 102.

The same is true of the opposite motion when a force is applied by spherical gear 102 resulting in motion of one or both spur gears 106. For example, motors 136 may act as generators to generate electricity in response to movement by spherical gear 102. This type of application could be used for generating electricity from various kinds of motion such as wind or constantly shifting ocean currents.

In another embodiment, surface 130 of spherical gear 102 may be smooth and spur gears 106 are replaced with a pair of omni-directional wheels ("omni-wheels"), which include a plurality of wheels mated to a surface at different angles. The omni-wheels are frictionally mated to the surface 130 of spherical gear 102 and may be actuated by an attached motor. Alternatively, the motion of the spherical gear about pivot 112 may be translated to one or more wheels of the omni-wheels as will be understood by one skilled in the art.

Figure 8:
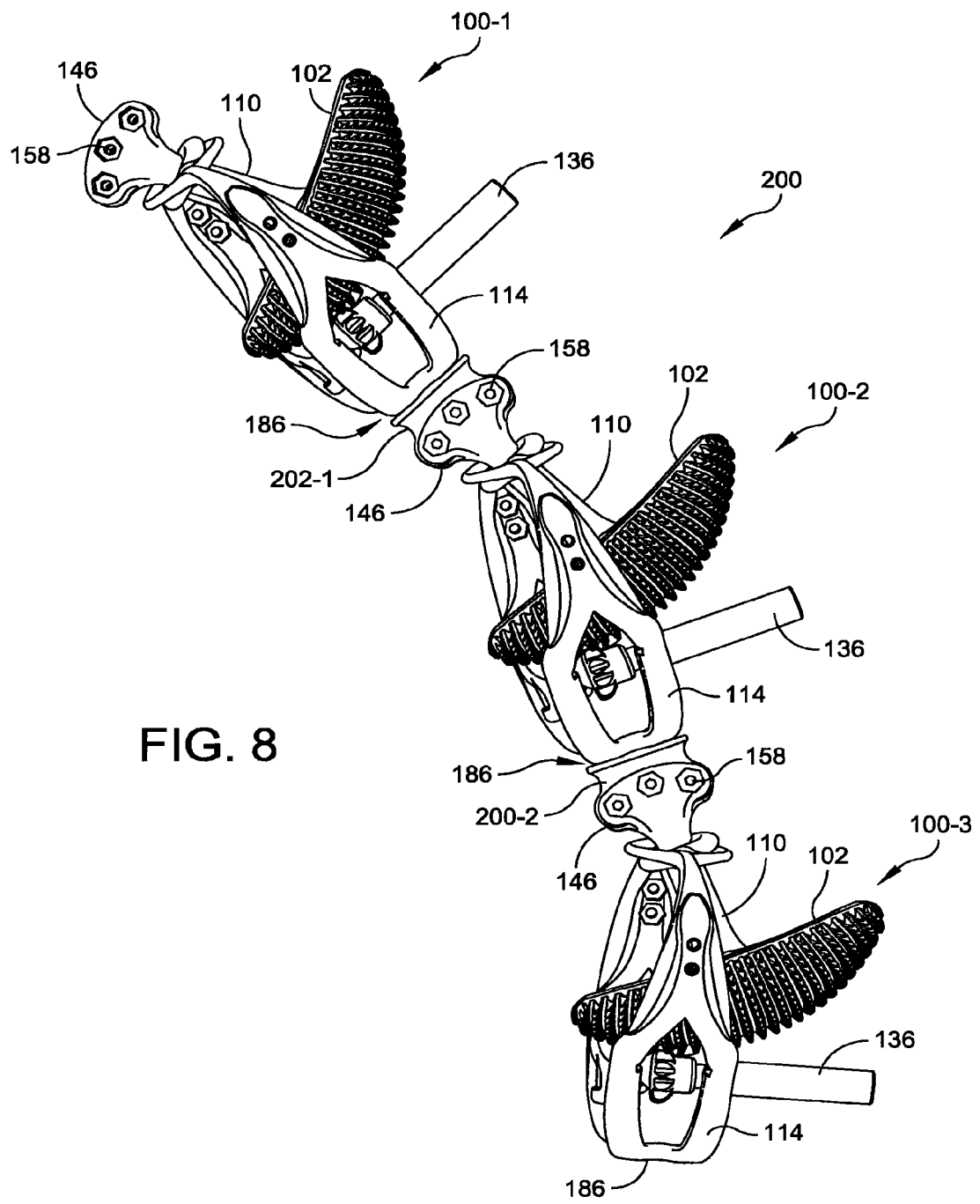
FIG. 8 is a side view of a plurality of gear assemblies coupled together to form an arm.

The system may be used as part of a robotic joint, such as a shoulder or an arm. For example, FIG. 8 illustrates one example of a robotic arm 200 including a plurality of gear assemblies 100-1, 100-2, and 100-3 (collectively referred to as "gear assemblies 100"). Although three gear assemblies 100 are illustrated, one skilled in the art will understand that fewer or more gear assemblies may be coupled together. As shown in FIG. 8, adjacent gear assemblies, e.g., assemblies 100-1 and 100-2 and assemblies 100-2 and 100-3, may be coupled together by a coupling plate 202, which may include a plurality of holes (not shown).

A first set of holes defined by coupling plate 202 are sized and arranged to align with holes 158 of second mounting end 158 of mounting rod 110 when coupling plate 202 is received within slot 162 defined by projections 160. A second plurality of holes are defined by a second end of coupling plate 202 and are sized and arranged to align with mounting holes 194 of the assembly mounting section 186 of support structure 114. Screws may be used to couple together gear assemblies 100 to coupling plate 202.

Figure 9:
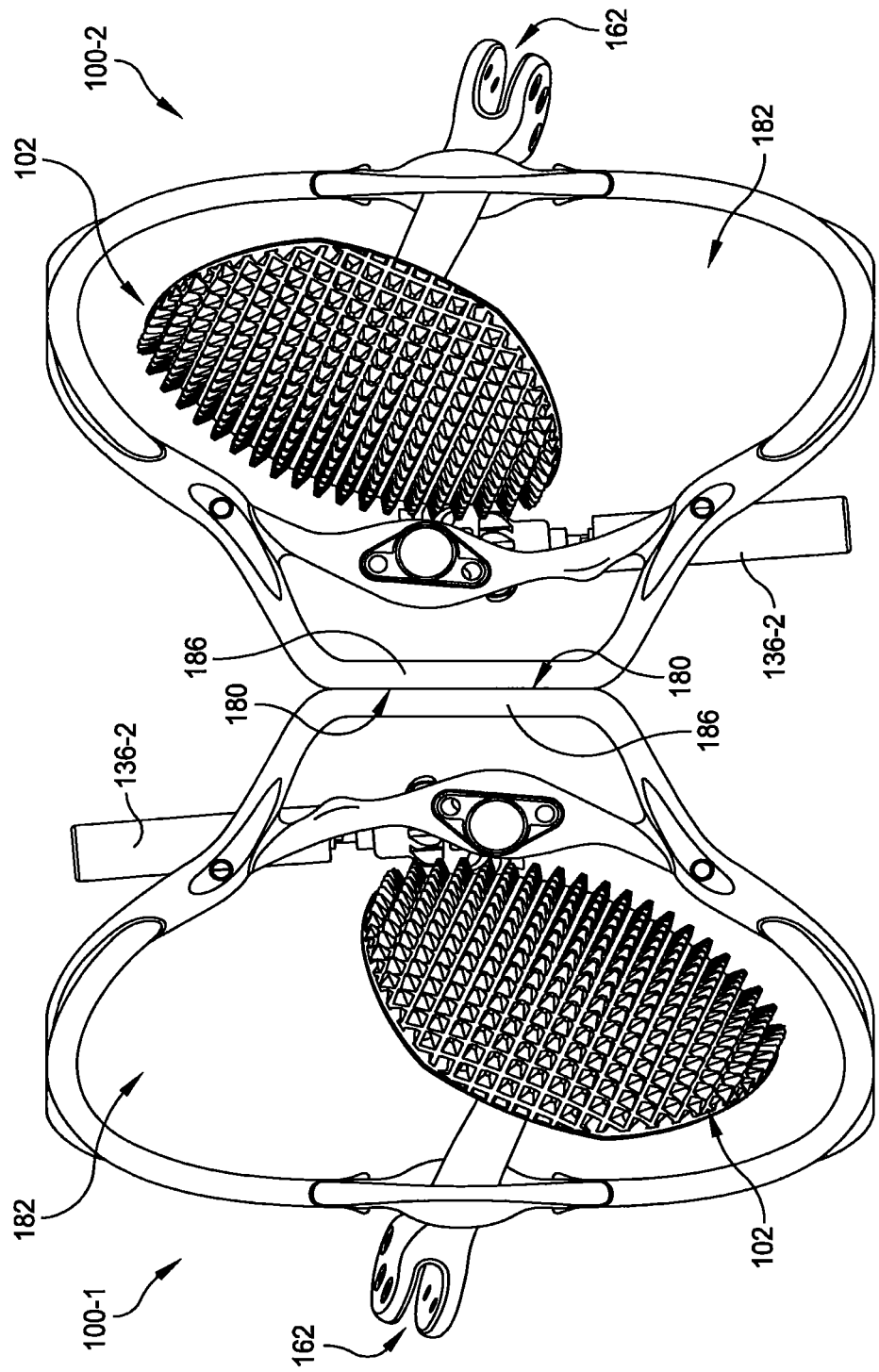
FIG. 9 is a side view of a pair of gear assemblies coupled together.

FIG. 9 illustrates manner in which gear assemblies 100 may be coupled together. As illustrated in FIG. 9, gear assemblies 100 are coupled to each other by assembly mounting sections 186 disposed on the mounting side 180. Screws or bolts may be used in connection with mounting holes 190 to mate gear assembly 100-1 and gear assembly 100-2.

The disclosed gear assembly 100 is able to generate larger amounts of torque with lower friction compared to conventional systems as the spur gears are able to pass through channels defined by the teeth of the spherical gear when the spherical gear moves in one of two directions. Additionally, the gear assembly may advantageously be coupled together to provide robotic arms having a full range of motion.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A gear system, comprising:
   a gimbal;
   a first gear having a body defining a portion of a sphere and including a curved surface, the first gear coupled to the gimbal and including a plurality of teeth extending from the curved surface;
   a second gear including a plurality of teeth, the second gear disposed adjacent to the first gear such that the plurality of teeth of the second gear engage the plurality of teeth of the first gear; and
   a third gear including a plurality of teeth, the third gear disposed adjacent to the first gear such that the plurality of teeth of the third gear engage the plurality of teeth of the first gear,
   wherein the second gear rotates about a first axis when the first gear moves in a first direction, and the third gear rotates about a second axis when the first gear moves in a second direction that is substantially perpendicular to the first direction.

2. The gear system of claim 1, wherein the second gear rotates about the first axis and the third gear rotates about the second axis when the first gear moves in a third direction that is not orthogonal to or co-linear with the first and second directions.

3. The gear system of claim 1, wherein the first gear is coupled to the pivot by a mounting rod having an elongate body.

4. The gear system of claim 3, wherein the gimbal includes a shaft that is pivotally received by a hole defined by the elongate body of the mounting rod.

5. The gear system of claim 1, wherein the teeth of the first gear are substantially aligned in rows and columns along the curved surface to define a plurality of channels.

6. The gear system of claim 5, wherein the plurality of channels extend in arcs with respect to a center of the gimbal.

7. The gear system of claim 1, further comprising a support structure coupled to the pivot and to the first and second gears.

8. The gear system of claim 7, wherein the gimbal is supported by the support structure.

9. The gear system of claim 1, wherein the teeth of the first gear are substantially quadrilateral pyramids.

10. The gear system of claim 1, wherein the curved surface is one of a convex or a concave surface.

11. A gear system, comprising:
    a first support structure;
    a first gear including a body defining a portion of a sphere and including a first curved surface, the first gear coupled to the first support structure by a first gimbal, a plurality of teeth extend from the first curved surface in a plurality of rows and columns that define a plurality of channels; and
    first and second spur gears supported by the first support structure in an approximately orthogonal relationship to one another, the first spur gear including a plurality of teeth that engage the plurality of teeth of the first gear such that the first spur gear rotates about a first axis when the first gear moves in a first direction, the second spur gear including a plurality of teeth that engage the plurality of teeth of the first gear such that the second spur gear rotates about a second axis when the first gear moves in a second direction that is approximately orthogonal to the first direction.

12. The gear system of claim 11, wherein the first and second gears both rotate about their respective axes when the first gear moves in a third direction that is not orthogonal to or co-linear with the first and second directions.

13. The gear system of claim 11, further comprising:
    a second support structure coupled to the first support structure;
    a second gear including a body defining a portion of a sphere and including a second curved surface, the second gear coupled to the second support structure by a second gimbal, a plurality of teeth extend from the second curved surface in a plurality of rows and columns that define a second plurality of channels; and
    third and fourth spur gears supported by the first support structure in an approximately orthogonal relationship to one another, the third spur gear including a plurality of teeth that engage the plurality of teeth of the second gear such that the third spur gear rotates about a third axis when the second gear moves in a third direction, the fourth spur gear including a plurality of teeth that engage the plurality of teeth of the second gear such that the fourth spur gear rotates about a fourth axis when the second gear moves in a fourth direction that is approximately orthogonal to the third direction.

14. The gear system of claim 11, further comprising:
    a second support structure;
    a second gear including a body defining a portion of a sphere and including a second curved surface, the second gear coupled to the second support structure by a second gimbal, a plurality of teeth extend from the second at least one curved surface in a plurality of rows and columns that define a second plurality of channels; and
    third and fourth spur gears supported by the first support structure in an approximately orthogonal relation to one another, the third spur gear including a plurality of teeth that engage the plurality of teeth of the second gear such that the third spur gear rotates about a third axis when the second gear moves in a third direction, the fourth spur gear including a plurality of teeth that engage the plurality of teeth of the second gear such that the fourth spur gear rotates about a fourth axis when the second gear moves in a fourth direction that is approximately orthogonal to the third direction, wherein the first gear is coupled to the first two-axis gimbal by a first mounting rod, the second gear is coupled to the second two-axis gimbal by a second mounting rod, and the first and second mounting rods are coupled together.

15. The gear system of claim 11, wherein each of the plurality of channels of the first gear defines an arc having a center point at a center of the first gimbal.

* * * * *